United States Patent Office 3,034,504
Patented May 15, 1962

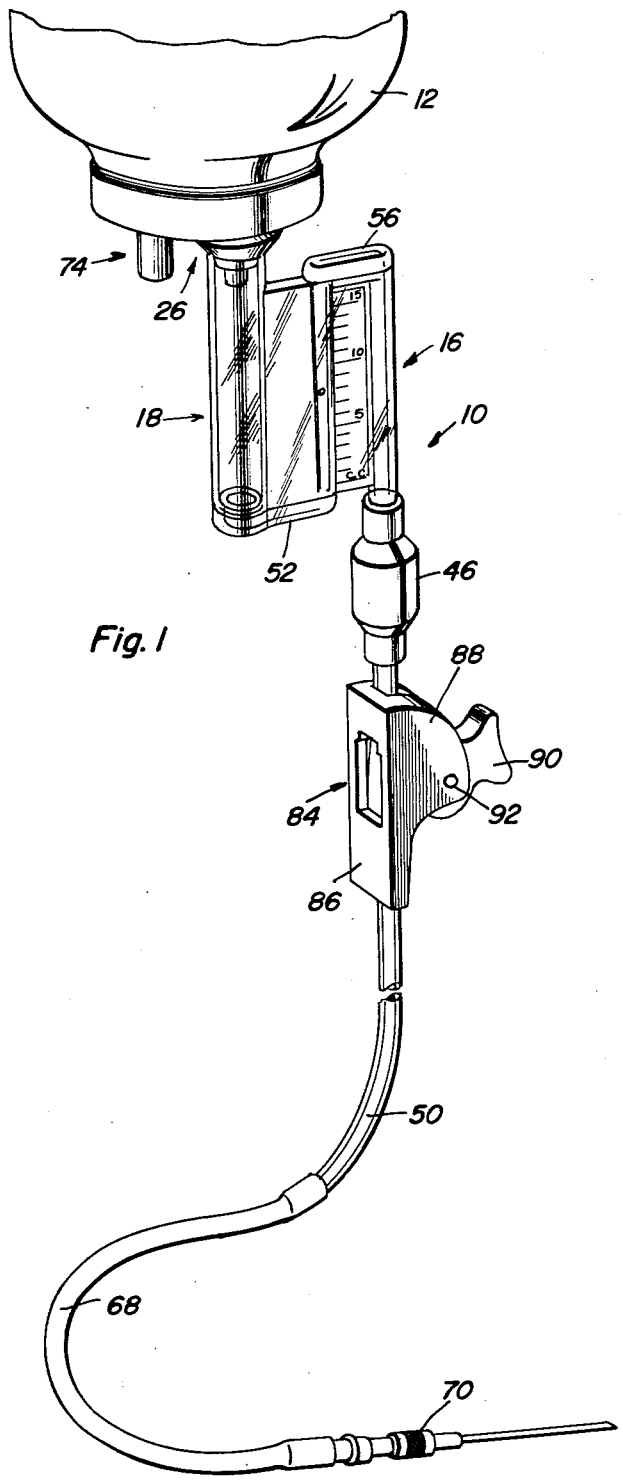
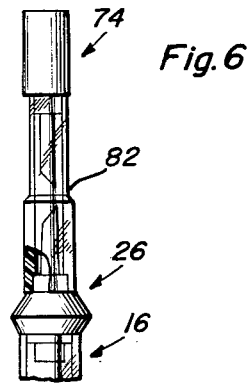
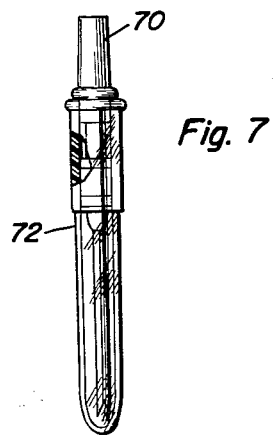
Travis W. Winsor
Edward Galasyn
INVENTORS

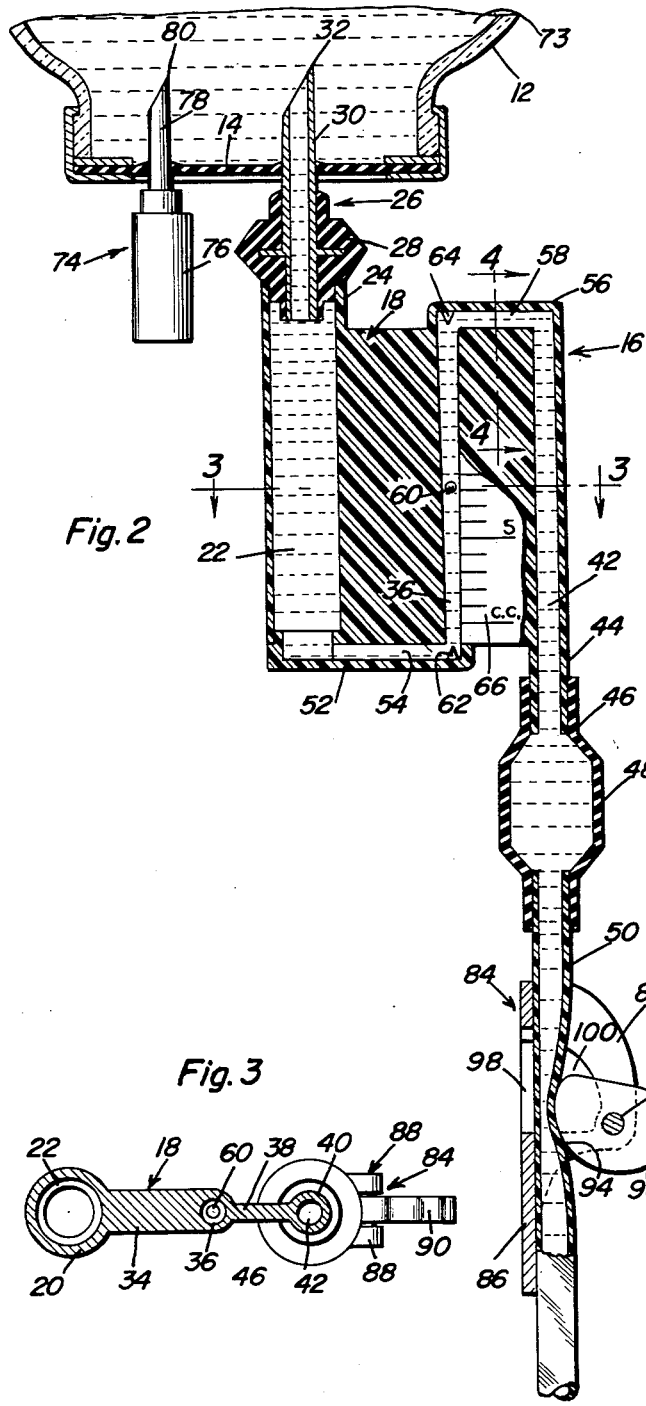
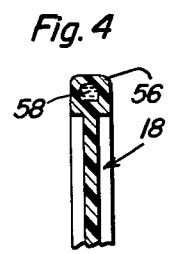
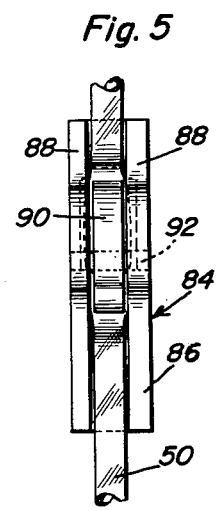
Travis W. Winsor
Edward Galasyn
INVENTORS

3,034,504
FLOW METER FOR AN INTRAVENOUS
INJECTION UNIT
Travis W. Winsor and Edward Galasyn, Los Angeles, Calif., assignors to Galasyn Inc., a corporation of California
Filed Nov. 21, 1958, Ser. No. 775,496
8 Claims. (Cl. 128—214)

This invention relates in general to new and useful improvements in medical equipment, and more specifically to a fluid flow rate measuring device.

When giving intravenous injections or transfusions, it is necessary that the fluid flow into the human body at a prescribed rate. At the present time this is determined by counting the number of drops of the fluid as it drips from the bottle and determining the rate of flow by the number of drops per minute. This is a very inaccurate manner of determining the rate of flow and often times an over dosage of the medication may prove detrimental to the patient.

It is therefore the primary object of this invention to provide a flow meter which is so constructed whereby when incorporated in the tube used for an intravenous injection, it may be used to accurately indicate at all times the rate of flow through such tube.

Another object of this invention is to provide a flow meter which may be used in conjunction with intravenous injections, the flow meter being of an extremely simple construction and formed of inexpensive materials whereby the flow meter may be accurate and at the same time disposable.

Another object of this invention is to provide an improved flow meter for use in intravenous injections and the like, the flow meter employing a vertically disposed upwardly increasing cross-sectional tapered passage on which there is disposed a restricter which freely floats in the fluid passing through the passage or chamber whereby the restricter, when viewed together with an indicating scale, will indicate the amount of flow through the flow meter.

A further object of this invention is to provide an improved flow meter for indicating the rate of flow of a fluid, the flow meter being in the form of a simple molded piece of plastic which is so constructed whereby the rate of flow therethrough will be indicated by the movement of a restrictor with respect to a scale so that the flow meter is direct reading.

A still further object of this invention is to provide an improved clamp for engagement with a flexible tube, which clamp is of the cam type and which may be used accurately to control the flow of fluid through the tube.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of an intravenous injection unit which incorporates the flow meter and clamp and shows the general arrangement of the unit in conjunction with a bottle;

FIGURE 2 is an enlarged fragmentary sectional view taken through the upper portion of the intravenous injection unit and shows the specific construction of both the flow meter and the clamp;

FIGURE 3 is an enlarged sectional view taken substantially upon the plane indicated by the section line 3—3 of FIGURE 2 and shows the specific cross-section of the flow meter;

FIGURE 4 is an enlarged fragmentary sectional view taken substantially upon the plane indicated by the section line 4—4 of FIGURE 2 and shows further the details of the construction of the flow meter;

FIGURE 5 is an enlarged elevational view of the clamp and shows the arrangements of the components thereof;

FIGURE 6 is an elevational view showing the manner in which the fittings for the bottle are interconnected prior to use in a sealed relation; and FIGURE 7 is an elevational view showing the manner in which the injection needle is sealed prior to use.

Referring now to the drawings in detail, it will be seen that there is illustrated an intravenous injection unit which is referred to in general by the reference numeral 10 and which incorporates the components which are the subject of this invention. The intravenous injection unit 10 is used in conjunction with an intravenous bottle 12 or with a blood plasma bottle, which bottle has a penetrable closure 14.

The intravenous injection unit 10 includes a flow meter which is referred to in general by the reference numeral 16. The flow meter 16 is in the form of a plastic body 18 whose cross-section is best illustrated in FIGURE 3. The plastic body 18 includes a vertically disposed cylindrical portion 20 which defines a drip chamber 22. The drip chamber 22 includes an upwardly projecting extension 24 in which there is seated in sealed relation an intake fitting which is referred to in general by the reference numeral 26. The intake fitting 26 includes a tubular plug 28 which is seated in the upper end of the extension 24 and which carries a rigid tube 30, the tube 30 extending entirely through the plug 28. The upper end of the tube 30 is cut at an angle to form a point 32 whereby the fitting 26 may be pushed through the closure 14 so as to communicate the drip chamber 22 with the interior of the intravenous bottle 12.

The body 18 of the flow meter 26 includes a web 34 which is connected to the tubular portion 20 and which has formed therein a flow measuring chamber 36. The flow measuring chamber 36 is circular in cross-section, as is shown in FIGURE 3, and increases in width from the bottom to the top thereof.

The body 18 also includes a second web 38 which is formed integral with the web 34 and formed integral with web 38 remote from the web 34 is a tubular portion 40 which defines a discharge chamber 42. The discharge chamber 42 is provided at the lower end thereof with an extension 44, as is best shown in FIGURE 2, to which there is connected a coupling 46 having an enlarged central portion 48. The coupling 46 has in turn connected thereto a flexible tube 50.

In order that the drip chamber 22 may be communicated with the flow measuring chamber 36, there is secured to the under side of the body 18 a lower transverse member 52 which is generally channel-shaped in cross-section and which defines a lower transverse flow passage 54. A second transverse member 56 extends across the top of the body 18 between the flow measuring chamber 36 and the discharge chamber 42. The transverse member 56 is also channel-shaped in cross-section, but is inverted to combine with the body 18 to form an upper transverse flow passage 58.

Positioned in the flow measuring chamber 36 is a restrictor in the form of a flow indicating member 60. The flow indicating member 60 is of a diameter approximately equal to the diameter of the flow measuring chamber 36 at the lower end thereof. In order to prevent the movement of the flow indicating member 60 out of the flow measuring chamber 36, there is carried by the transverse member 52 in alignment with the flow measuring chamber 36 a stop 62. A similar stop 64 is carried by the transverse member 56 in alignment with the upper end of the flow measuring chamber 36.

As liquid flows through the transverse flow passage 54 and up into the lower end of the flow measuring chamber 36, the flow of such liquid is restricted by the flow indicating member 60. Inasmuch as the flow indicating member 60 is a restricter, as the flow increases, it is necessary that the flow indicating member 60 move upwardly in the flow measuring chamber 36 so that the cross-section of the flow measuring chamber 36 available for the flow of liquid may increase. This upward movement of the flow indicating member 60 may be correlated into the rate of flow of the liquid. Accordingly, the web 38 is provided with indicia 66 which, when read together with the flow indicating member 60, will indicate the rate fo flow through the flow meter 16.

Telescoped over the lower end of the flexible tube 50 is a second tube 68. The tube 68 is telescoped over the upper end of a conventional injection needle 70. As is shown in FIGURE 7, the injection needle 70 is provided with a cover 72 which seals the exposed portions of the needle 70. When the intravenous injection unit 10 is shipped, the tube 68 will be telescoped over the upper end of the injection needle 70, as is illustrated in FIGURE 1. Thus the injection needle 70 is sealed against contamination.

In order that liquid, such as an intravenous solution 73, may run out of the intravenous bottle 12, it is necessary that there be provided an air vent. Accordingly, the intravenous injection unit 10 also includes a vent member which is referred to in general by the reference numeral 74. The vent member 74 includes a valve unit 76 which has extending therefrom a tubular member 78. The tubular member 78 is cut on a bevel so as to provide a point 80 to facilitate the penetration of the closure 14 therewith. The vent member 74 is of a conventional type. In order that the tubular members 30 and 78 may be sealed against contamination during shipment of the intravenous injection unit, there is provided a disposable connector 82 which connects the vent member 74 to the intake fitting 26, as is best shown in FIGURE 6.

So that the flow of liquid from the intravenous bottle 12 may be controlled, there is provided a flow controlling clamp which is referred to in general by the reference numeral 84. The clamp 84 includes a base plate 86 which has extending upwardly from opposite sides thereof a pair of spaced parallel ears 88. Disposed intermediate the ears 88 is a cam type clamp 90 which is pivotally mounted on a pin 92 which extends between the ears 88. The clamp member 90 includes a cam surface 94 and a handle portion 96.

The plate 86 is provided with an opening 98 generally in alignment with the clamp member 90. Also, the ears 88 are relieved as at 100. These openings are necessitated by the fact that when the clamp member 90 engages the flexible tube 50, which passes between the clamp member 90 and the plate 86, during the squeezing action of the tube 50, the tube will bulge sidewise into the relieved areas 100 and be forced to the left, as viewed in FIGURE 2, into the opening 98.

In the operation of the intravenous injection unit 10, after it has been set up, flow therethrough is controlled by positioning of the clamp member 90. The rate of flow may be readily determined by viewing the flow meter 16 through the indication of the rate of flow by the flow indicating member 60. Thus by regulating the position of the clamp member 90, the rate of flow from the intravenous bottle 12 into the patient may be accurately and readily controlled.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An intravenous injection unit comprising a flow meter, an intake fitting on said flow meter for attachment to an intravenous bottle, a flexible discharge tube connected to said flow meter for receiving liquid from said flow meter, an injection needle on the opposite end of said tube, and a flow control clamp on said tube, said flow meter including a body, a drip chamber in said body aligned with said intake fitting, a discharge chamber spaced from said drip chamber and aligned with said discharge tube, an intermediate flow measuring chamber, a lower transverse flow passage communicating said drip chamber with said flow measuring chamber, and an upper transverse flow passage communicating said flow measuring chamber with said discharge chamber.

2. An intravenous injection unit comprising a flow meter, an intake fitting on said flow meter for attachment to an intravenous bottle, a flexible discharge tube connected to said flow meter for receiving liquid from said flow meter, an injection needle on the opposite end of said tube, and a flow control clamp on said tube, said flow meter including a body, a drip chamber in said body aligned with said intake fitting, a discharge chamber spaced from said drip chamber and aligned with said discharge tube, an intermediate flow measuring chamber, a lower transverse flow passage communicating said drip chamber with said flow measuring chamber, and an upper transverse flow passage communicating said flow measuring chamber with said discharge chamber, said flow measuring chamber being vertically disposed and circular in cross-section, said flow measuring chamber being of a constantly increasing diameter from the lower end thereof to the upper end thereof, and a flow indicating member in said flow measuring chamber.

3. An intravenous injection unit comprising a flow meter, an intake fitting on said flow meter for attachment to an intravenous bottle, a flexible discharge tube connected to said flow meter for receiving liquid from said flow meter, an injection needle on the opposite end of said tube, and a flow control clamp on said tube, said flow meter including a body, a drip chamber in said body aligned with said intake fitting, a discharge chamber spaced from said drip chamber and aligned with said discharge tube, an intermediate flow measuring chamber, a lower transverse flow passage communicating said drip chamber with said flow measuring chamber, and an upper transverse flow passage communicating said flow measuring chamber with said discharge chamber, said flow measuring chamber being vertically disposed and circular in cross-section, said flow measuring chamber being of a constantly increasing diameter from the lower end thereof to the upper end thereof, and a flow indicating member in said flow measuring chamber, indicia on said body adjacent with said flow measuring chamber and cooperating with said flow indicating member to directly indicate the rate of flow.

4. An intravenous injection unit comprising a flow meter, an intake fitting on said flow meter for attachment to an intravenous bottle, a flexible discharge tube connected to said flow meter for receiving liquid from said flow meter, an injection needle on the opposite end of said tube, and a flow control clamp on said tube, said flow meter including a body, a drip chamber in said body aligned with said intake fitting, a discharge chamber spaced from said drip chamber and aligned with said discharge tube, an intermediate flow measuring chamber, a lower transverse flow passage communicating said drip chamber with said flow measuring chamber, an upper transverse flow passage communicating said flow measuring chamber with said discharge chamber, said flow measuring chamber being vertically disposed and circular in cross-section, said flow measuring chamber being of a constantly increasing diameter from the lower end thereof to the upper end thereof, and a flow indicating member in said flow measuring chamber, indicia on said body adjacent with said flow measuring chamber and cooperating with said flow indicating member to directly indicate the rate of flow, and stop means at opposite ends of said flow measuring chamber for retaining said flow indicating member in said flow measuring chamber.

5. A flow meter comprising a body having attached to an upper part thereof an intake fitting and to a lower part thereof a discharge hose, a drip chamber in said body aligned with said intake fitting, a discharge chamber spaced from said drip chamber and aligned with said discharge tube, an intermediate flow measuring chamber, a lower transverse flow passage communicating said drip chamber with said flow measuring chamber, and an upper transverse flow passage communicating said flow measuring chamber with said discharge chamber.

6. A flow meter comprising a body having attached to an upper part thereof an intake fitting and to a lower part thereof a discharge hose, a drip chamber in said body aligned with said intake fitting, a discharge chamber spaced from said drip chamber and aligned with said discharge tube, an intermediate flow measuring chamber, a lower transverse flow passage communicating said drip chamber with said flow measuring chamber, and an upper transverse flow passage communicating said flow measuring chamber with said discharge chamber, said flow measuring chamber being vertically disposed and circular in cross-section, said flow measuring chamber being of a constantly increasing diameter from the lower end thereof to the upper end thereof, and a flow indicating member in said flow measuring chamber.

7. A flow meter comprising a body having attached to an upper part thereof an intake fitting and to a lower part thereof a discharge hose, a drip chamber in said body aligned with said intake fitting, a discharge chamber spaced from said drip chamber and aligned with said discharge tube, an intermediate flow measuring chamber, a lower transverse flow passage communicating said drip chamber with said flow measuring chamber, and an upper transverse flow passage communicating said flow measuring chamber with said discharge chamber, said flow measuring chamber being vertically disposed and circular in cross-section, said flow measuring chamber being of a constantly increasing diameter from the lower end thereof to the upper end thereof, and a flow indicating member in said flow measuring chamber, indicia on said body adjacent with said flow measuring chamber and cooperating with said flow indicating member to directly indicate the rate of flow.

8. An intravenous injection unit comprising a flow meter, an intake fitting on said flow meter for attachment to an intravenous bottle, a flexible discharge tube connected to said flow meter for receiving liquid from said flow meter, an injection needle on the opposite end of said tube, and a flow control clamp on said tube, said flow meter including a body, a drip chamber in said body aligned with said intake fitting, a discharge chamber spaced from said drip chamber and aligned with said discharge tube, an intermediate flow measuring chamber, a lower transverse flow passage communicating said drip chamber with said flow measuring chamber, and an upper transverse flow passage communicating said flow measuring chamber with said discharge chamber, said flow control clamp including an elongated plate engaging said tube, a pair of parallel ears extending from opposite edges of said plate and receiving the tube therebetween, a cam type clamp member disposed between the ears, means pivotally connecting the clamp member to the ears for pivotal movement whereby the cam member will engage the tube in opposition to the plate for clamping the tube and controlling flow therethrough, said plate having an opening therein in alignment with the cam member thereby enabling the tube to be deformed partially into the opening whereby the cam member may completely stop flow in the tube.

References Cited in the file of this patent

UNITED STATES PATENTS

| | | |
|---|---|---|
| 1,050,043 | Sellar | Jan. 7, 1913 |
| 1,432,882 | Lobl | Oct. 24, 1922 |
| 1,599,881 | Eisele | Sept. 14, 1926 |
| 2,568,108 | Barton | Sept. 18, 1951 |
| 2,634,856 | Perkins | Apr. 14, 1953 |
| 2,672,051 | Butler | Mar. 16, 1954 |
| 2,681,654 | Ryan et al. | June 22, 1954 |
| 2,758,598 | Cutter | Aug. 14, 1956 |
| 2,802,716 | Cutter | Aug. 13, 1957 |
| 2,841,357 | Little | July 1, 1958 |
| 2,882,725 | Goodhue | Apr. 21, 1959 |
| 2,941,778 | Bujan | June 21, 1960 |

FOREIGN PATENTS

| | | |
|---|---|---|
| 384,167 | France | Mar. 31, 1908 |
| 1,000,300 | France | Oct. 10, 1951 |